US008282485B1

(12) United States Patent
Zhang

(10) Patent No.: US 8,282,485 B1
(45) Date of Patent: Oct. 9, 2012

(54) CONSTANT AND SHADOWLESS LIGHT SOURCE

(76) Inventor: Evan Y. W. Zhang, Beavercreek, OH (US)

( * ) Notice: Subject to any disclaimer, the term of this patent is extended or adjusted under 35 U.S.C. 154(b) by 494 days.

(21) Appl. No.: 12/478,515

(22) Filed: Jun. 4, 2009

Related U.S. Application Data

(60) Provisional application No. 61/058,790, filed on Jun. 4, 2008, provisional application No. 61/058,798, filed on Jun. 4, 2008.

(51) Int. Cl.
*A63F 9/24* (2006.01)
(52) U.S. Cl. ......................................................... 463/37
(58) Field of Classification Search ................... 353/28, 353/122; 463/31, 37; 363/28, 122
See application file for complete search history.

(56) References Cited

U.S. PATENT DOCUMENTS

| 4,843,568 | A |   | 6/1989 | Krueger et al. |
|---|---|---|---|---|
| 5,196,929 | A |   | 3/1993 | Miyasaka |
| 5,534,917 | A |   | 7/1996 | MacDougall |
| 5,940,139 | A | * | 8/1999 | Smoot ............................ 348/584 |
| 6,100,517 | A |   | 8/2000 | Yahav et al. |
| 6,697,518 | B2 |   | 2/2004 | Belhumeur et al. |
| 6,796,656 | B1 | * | 9/2004 | Dadourian ....................... 353/28 |
| 7,352,009 | B2 |   | 4/2008 | Fudeta |
| 7,612,870 | B2 |   | 11/2009 | Graff et al. |
| 7,714,342 | B2 |   | 5/2010 | Lee et al. |
| 8,187,097 | B1 | * | 5/2012 | Zhang ............................ 463/37 |
| 2001/0031067 | A1 |   | 10/2001 | Kennedy et al. |
| 2005/0110964 | A1 | * | 5/2005 | Bell et al. ...................... 353/122 |
| 2006/0284790 | A1 |   | 12/2006 | Tegreene et al. |
| 2007/0195162 | A1 |   | 8/2007 | Graff et al. |
| 2008/0080789 | A1 |   | 4/2008 | Marks et al. |
| 2008/0215994 | A1 |   | 9/2008 | Harrison et al. |
| 2008/0220867 | A1 |   | 9/2008 | Zalewski et al. |
| 2008/0306708 | A1 |   | 12/2008 | Germain et al. |
| 2008/0309660 | A1 |   | 12/2008 | Bertolami et al. |
| 2009/0066690 | A1 |   | 3/2009 | Harrison |
| 2009/0115994 | A1 |   | 5/2009 | Stettner et al. |
| 2009/0135606 | A1 | * | 5/2009 | Young ............................ 362/310 |
| 2009/0231425 | A1 |   | 9/2009 | Zalewski |
| 2009/0233769 | A1 |   | 9/2009 | Pryor |
| 2011/0034244 | A1 |   | 2/2011 | Marks et al. |
| 2011/0128555 | A1 |   | 6/2011 | Rotschild et al. |

OTHER PUBLICATIONS

Office Action dated Sep. 9, 2011, U.S. Appl. No. 12/478,533.

* cited by examiner

*Primary Examiner* — Thomas L Dickey
(74) *Attorney, Agent, or Firm* — Thomas E. Lees, LLC

(57) ABSTRACT

A device is provided for capturing images of targets of interest for interaction with or in response to electronic events, such as may be generated by video games and/or other interactive applications. The device includes a shadowless light source, such as one or more light emitting devices that are capable of emitting light into an environment where the emitted light is in at least a first predetermined frequency range that defines a spectral range outside the range of the fluctuating ambient light. A camera has a light receiving lens and an image sensor for converting the light received through the light receiving lens into image data that is obtained by a processor to form a digital representation of the target of interest. Also, the device may include a filter to substantially block light in an anticipated spectral range of fluctuating ambient light.

11 Claims, 11 Drawing Sheets

THE PRINCIPLES OF THE 3-D GATED CAMERA

CONSTANT AND SHADOWLESS LIGHT SOURCE

CROSS REFERENCE TO RELATED APPLICATIONS

This application claims the benefit of U.S. Provisional Patent Application Ser. No. 61/058,790 filed Jun. 4, 2008 entitled "A CONSTANT AND SHADOWLESS LIGHT SOURCE", the disclosure of which is hereby incorporated by reference in its entirety. This application also claims the benefit of U.S. Provisional Patent Application Ser. No. 61/058, 798 filed Jun. 4, 2008 entitled "MEASUREMENT AND SEGMENT OF PARTICIPANT'S MOTION IN GAME PLAY", the disclosure of which is also hereby incorporated by reference in its entirety. This application is further related to U.S. patent application Ser. No. 12/478,533, entitled "MEASUREMENT AND SEGMENT OF PARTICIPANT'S MOTION IN GAME PLAY", filed concurrently herewith, the disclosure of which is also incorporated by reference in its entirety.

BACKGROUND

The present invention relates in general to image capture systems and components thereof. The present invention is more particularly drawn to systems and methods of capturing images of targets of interest, e.g., persons or objects, for interaction with or in response to electronic events, such as may be generated by video games and/or other interactive computer applications.

Currently, video game systems are known, which provide a wireless controller that can be used as a hand-held pointing device for interaction with the associated game system. In this regard, the game system processor is capable of detecting movement of the pointing device to facilitate interaction with a corresponding game that is presented on a video display. However, even with the wireless pointing device, such game systems have many shortcomings.

For example, interaction with a game requires the user to wield the wireless hand-held pointing device. This requirement to hold onto a hand-held pointing device limits the freedom of the game participant to engage in game or non-game interaction that requires the use of fingers or hands. Moreover, the requirement of a wireless hand-held device precludes the use of feet, legs, head, etc., for interaction with the game system. Still further, required motions for game interaction, such as waving the wireless controller to play a game, may not be convenient or practical for all participants, especially those participants that have difficulty executing the required movements. Still further, the requirements of a given game or activity may not dictate such waiving motions typically required for detection of conventional hand-held pointing devices. Correspondingly, many games may not be played, e.g., due at least in part to the limitations of detectable movement of the wireless controller. As such, there are many activities that cannot be implemented or implemented well by the above-described type of game system.

Moreover, if a camera is used in game play, changes of ambient light, e.g., from the ceiling, walls, television (TV) monitor, etc., will largely affect the image obtained by the camera. Additionally, the shadow of the object will confuse the image of the object and reduce the operation accuracy, such as for gaming.

BRIEF SUMMARY

According to various aspects of the present invention, a device for capturing images of targets of interest for interaction with or in response to electronic events, such as may be generated by video games and/or other interactive computer applications is provided. The device comprises at least one illumination source that emits light into an environment to illuminate a target of interest, where the emitted light is in at least a first predetermined frequency range that defines a spectral range outside the range of fluctuating ambient light within the environment. The device also includes a camera having a light receiving lens and an image sensor for converting the light received through the light receiving lens to image data, wherein the image sensor is sensitive to light within the first predetermined frequency range.

Still further, the device includes a filter positioned along an optical path before the image sensor that is configured to substantially block light in the spectral range of fluctuating ambient light, and a processor configured to convert the image data from the image sensor to a digital representation of the target of interest. At least one illumination source is positioned sufficiently close to the light receiving lens of the camera so that the light receiving lens receives light from the at least one illumination source at a sufficiently small angle so as to at least substantially reduce detected shadows of the illuminated target of interest. According to further aspects of the present invention, the device may include a single camera, multiple cameras, e.g., as implemented by a stereo camera, or a multiple discrete cameras.

According to further aspects of the present invention, a method for capturing images of targets of interest for interaction with or in response to electronic events, such as may be generated by video games and/or other interactive computer applications, comprises emitting light into an environment to illuminate a target of interest utilizing at least one illumination source, where the emitted light is in at least a first predetermined frequency range that defines a spectral range outside the range of fluctuating ambient light within the environment.

The method also comprises receiving the emitted light by a camera having a light receiving lens and an image sensor for converting the light received through the light receiving lens to image data, wherein the image sensor is sensitive to light within the first predetermined frequency range and filtering the light received by the camera to substantially block light in the spectral range of fluctuating ambient light. Still further, the method comprises converting the image data from the image sensor to a digital representation of the target of interest, wherein at least one illumination source is positioned sufficiently close to the light receiving lens of the camera so that the light receiving lens receives light from the at least one illumination source at a sufficiently small angle so as to at least substantially reduce detected shadows of the illuminated target of interest.

DETAILED DESCRIPTION

Figure 1:
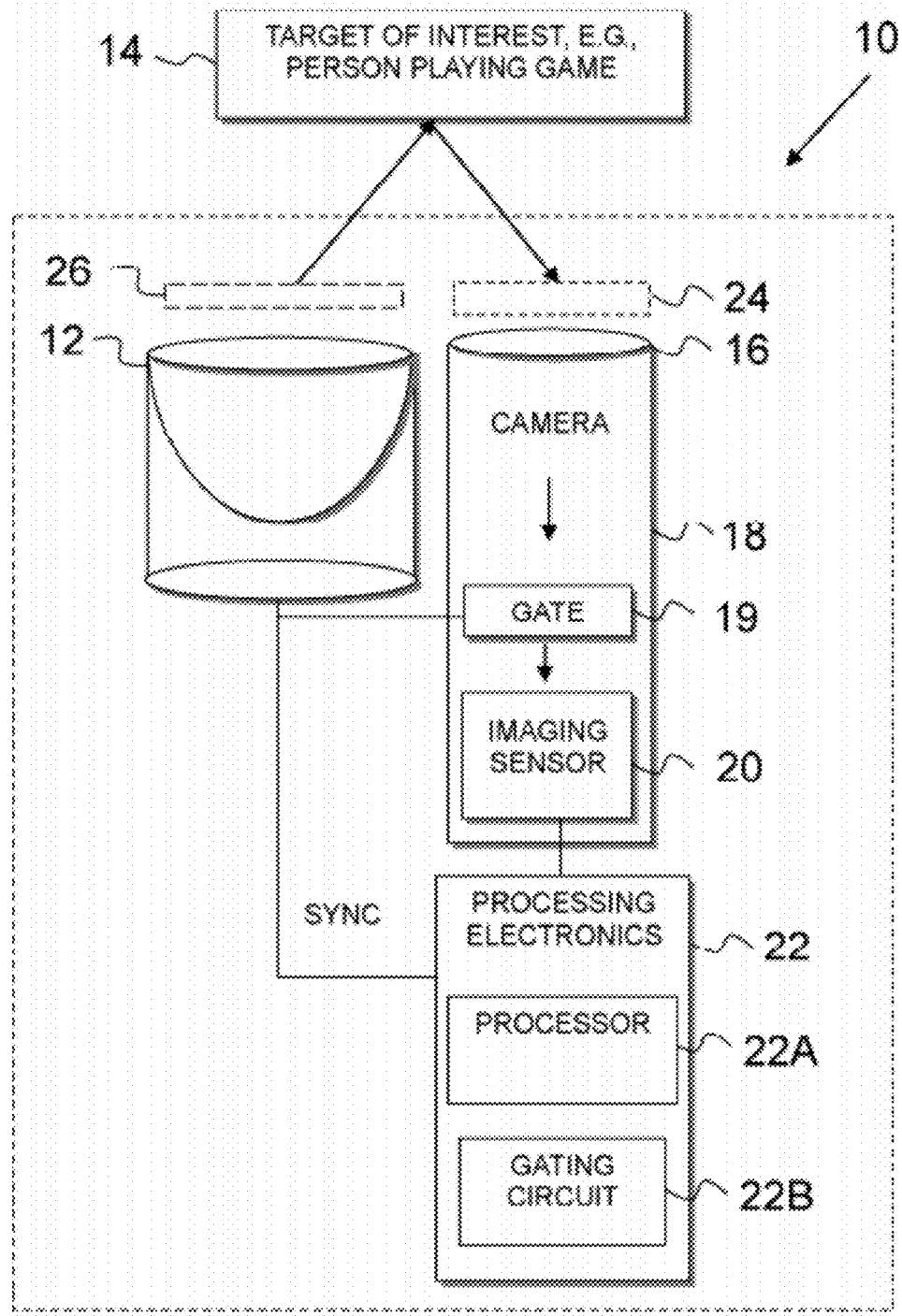
FIG. 1 is a schematic illustration of a system for measuring the location and/or movement of a target of interest, e.g., a body part of a participant of a video game or other virtual interactive application, according to various aspects of the present invention.

According to various aspects of the present invention, a camera is provided for capturing image data with regard to targets of interest, e.g., subjects or objects for interaction with or in response to electronic events, such as may be generated by video games and other interactive applications. For example, in the context of a video game system, a camera such as a stereo webcam may be utilized to capture the image of a participant interacting with a corresponding game. In this regard, the system is able to suitably track movement of the participant, including rotational motion executed by the participant.

As used herein, the term "webcam" refers to an image capturing device that is usable with game systems and other computer-based applications to provide one or more images. Webcams thus typically interface with a conventional computer and optionally, a web site. For example, many commercially available webcams include the capability of connecting to a computer for interaction with image-based software applications. However, these conventional webcams are sensitive to light in the visible (VIS) and/or near infrared (NIR) spectrums. In this regard, the intensity of light in the environment of the camera can affect the ability of the camera to perform in a manner that is satisfactory within the context of an associated application.

The performance of conventional cameras such as webcams may be further degraded by dynamic environmental conditions such as fluctuations of light including ambient light. For example, fluctuations of ambient visible light sufficient to degrade the image quality of conventional cameras may be derived from sources such as walls, ceilings, windows and other features within an associated environment. Moreover, fluctuations of ambient light sufficient to degrade the image quality of conventional cameras may be caused by video monitors including televisions, computer monitors or other video displays. Such typical exemplary ambient light conditions, including fluctuations thereof, thus limit the effective use of conventional cameras to capture targets of interest. Thus, for example, a webcam connected to a video game may not be able to adequately capture images that can identify a participant interacting with a video game system with sufficient quality to be effective at gaming.

According to aspects of the present invention however, a camera device is configured such that adverse effects from visible ambient light intensity fluctuations within an environment may be removed, eliminated or reduced to levels acceptable to the constraints of the corresponding system. Reduction or removal of such adverse effects of visible ambient light intensity fluctuations may be implemented by utilizing one or more light sources that emit light in a predetermined wave band that can be sufficiently detected by an image sensor associated with the corresponding camera despite dynamically changing ambient visible light conditions within the environment. As an example, light source(s) associated with the camera device may emit light within a predetermined wave band that is defined by invisible or substantially invisible light, which can be suitably detected by the image sensor associated with the camera device. As another example, light emitted from the light source(s) associated with the camera device may be defined by a wave band having a spectral range that is sufficiently outside the range of anticipated fluctuating ambient light so that light emitted from the light source(s) can be suitably detected by the image sensor associated with the camera device.

The system further comprises a corresponding camera that is responsive to the light within the predetermined wave band of the associated light source(s). Keeping with the above example, processed signals from the camera, e.g., image data provided by the camera, may be insensitive to visible light in a spectral band that exhibits intensity fluctuations that would otherwise adversely affect the quality of an image captured by the camera when illuminated by ambient and fluctuating light. Rather, according to various aspects of the present invention, the camera described more fully herein, responds to the invisible light of the associated light source(s) in a manner that is sufficiently immune to visible ambient light conditions, including dynamically changing ambient light.

For example, at least one controlled constant invisible light source, such as an ultra violet or near infrared light source may be utilized with a corresponding camera, which may be implemented as a webcam that is configured to respond to the invisible light, e.g., ultra violet or near infrared light, from the associated invisible light source(s), and preferably does not respond to or is relatively insensitive to visible light or other light outside the frequency range of light of the invisible light source.

Further, a conventional camera and corresponding imaging processing cannot distinguish subjects or objects from their corresponding shadows in a manner as good as the human eye and associated brain processing. For example, in a game, a conventional camera and corresponding control electronics cannot distinguish the image of a participant and the participant's shadow cast onto a ceiling, floor, wall or other surface(s). Thus, both the participant and the participant's shadow will control the virtual participant in the game.

However, according to further aspects of the present invention, a camera device is provided for applications such as gaming, interactive applications and/or computer-based applications that utilize image capture, which is capable of substantially filtering or otherwise removing shadows from the images captured by the camera, as will be described in greater detail herein.

Referring now to the drawings, and in particular, to FIG. 1, according to various aspects of the present invention, a system 10 comprises at least one illumination source 12 that emits light, e.g., a collimated thin beam or slightly divergent beam, to illuminate a target of interest 14, e.g., a participant interacting with a video game or other interactive virtual video application.

The light emitted from the illumination source(s) 12 is received at a light receiving lens 16 of an associated camera 18, such as a color or black and white webcam. An optional gate 19 of the camera 18 may selectively enable the light entering the camera 18 to be converted into an image using a suitable image sensor 20. The image sensor 20 may be implemented using a focal plane array or other suitable imaging technology. The output of the image sensor 20 is coupled to processing electronics 22, which process the image obtained by the image sensor 20 to derive a digital representation of a target of interest. For example, the processing electronics 22 may comprise hardware, such as a processor 22A and any required supporting electronics and/or optional software for implementing the necessary processing, e.g., 3-D computations from the image information obtained by the image sensor 20. The processing electronics 22 may also be utilized to control features of the system, e.g., by including a gating circuit 22B or other processing that facilitates the measurement of movement in a 3-D space as will be described in greater detail herein.

One or more optional filters may be positioned optically in front of either the light receiving lens 16 or image sensor 20, e.g., to block and/or transmit light in certain frequency bands so as to limit the frequency bands of light received by the image sensor 20. Thus, although FIG. 1 illustrates only a single filter positioned optically forward of the light receiving lens 16, it is understood that other/alternate filters and/or filter locations may also be utilized to filter the signal before the light reaches the image sensor 20. The processing electronics 22 may also/alternatively implement software filtering of the image collected by the image sensor, should such processing be necessary for a given application.

According to further aspects of the present invention, a plurality of cameras 18, e.g., two cameras 18, which can be implemented as discrete cameras or a single stereo camera/webcam, etc., may be coupled to the processing electronics 22 as will be described in greater detail herein. Regardless of the number of cameras in a particular implementation, the systems described herein may be utilized to measure aspects of a participant, including distance, angle and/or speed of the participant's hands, feet, head, etc. Additionally, image information can be combined by the processor 22 of the processing electronics 20 to render 3-D information.

Other optical components may be required by a particular implementation of the system 10, which are not illustrated for purposes of clarity of discussion herein.

Figure 2:
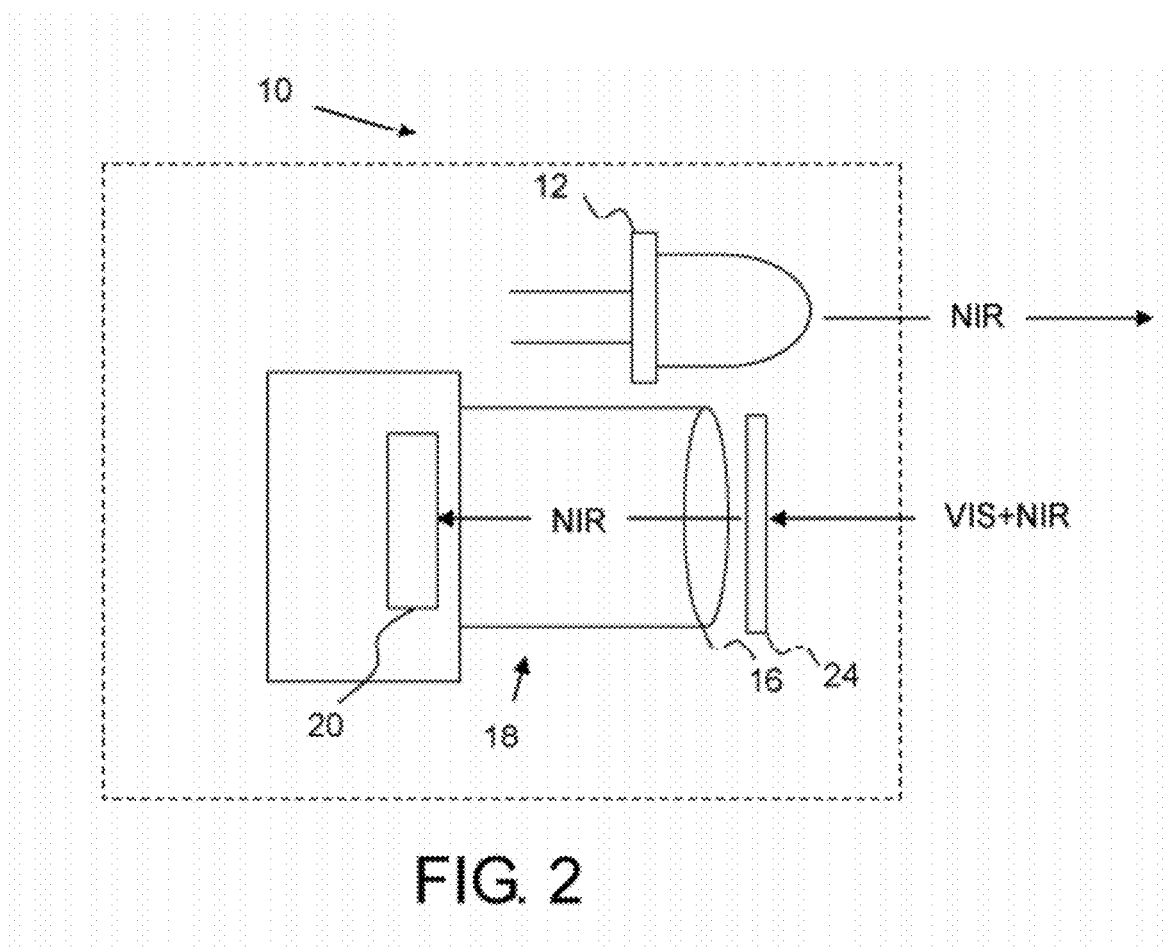
FIG. 2 is a schematic illustration of a system for removing or substantially reducing visible light from a camera device according to aspects of the present invention.

Light Detection:

Referring to FIG. 2, a partial view of select components of the camera system 10 are illustrated according to various aspects of the present invention. The illumination source 12 may in practice, include one or more light-emitting devices that are capable of emitting light into the environment, where the light is emitted in at least a first predetermined frequency range. The predetermined frequency range is selected such that images received by the camera 18 within the predetermined frequency range can be suitably processed despite anticipated visible light conditions, which may include dynamically changing light conditions.

As an illustrative example, the illumination source 12 may comprise one or more near infrared (NIR) lamps such as NIR light emitting diodes (LEDs) as schematically illustrated in FIG. 2. The illumination source(s) may also include ultra violet LEDs or other invisible or substantially invisible light sources. In certain embodiments, the illumination source 12 may alternatively comprise or otherwise include incandescent lamps, etc., which are utilized to illuminate a target of interest.

Going back to the example of FIG. 2, image sensor 20 is correspondingly sensitive to NIR light. In this regard, light detected by the camera 18 will be insensitive to dynamically changing visible light because the light detectable by the image sensor 20 defines a spectral range that is outside the range of anticipated fluctuating visible ambient light.

By way of illustration and not by way of limitation, at least one illumination source 12 comprises a parabolic light emitting diode that emits invisible light. Each parabolic light emitting diode may be implemented as parabolic invisible light emitting diode(s) (PLED or parabolic LED) as described more fully in U.S. Provisional Patent Application Ser. No. 61/058,790 filed Jun. 4, 2008 entitled "A CONSTANT AND SHADOWLESS LIGHT SOURCE", U.S. Provisional Patent Application Ser. No. 61/058,798, entitled "MEASUREMENT AND SEGMENT OF PARTICIPANT'S MOTION IN GAME PLAY" filed Jun. 4, 2008, and corresponding U.S. patent application Ser. No. 12/478,533, entitled "MEASUREMENT AND SEGMENT OF PARTICIPANT'S MOTION IN GAME PLAY", filed concurrently herewith, the disclosures of which are already incorporated by reference in their entirety.

Moreover, a filter 24 may be provided optically in front of the light receiving lens 16 or the image sensor 20 of the camera 18 to block light in spectral bands that are not of interest. For example, the filter 24 may reject light in spectral bands defined by the bands of anticipated fluctuating visible ambient light. Alternatively, the filter 24 may be transmissive to light only in the frequency range (or ranges) of the corresponding illumination source(s) 12.

Keeping with the example of FIG. 2, visible and NIR light is reflected back towards the camera 18. However, the filter blocks the visible light and passes the NIR light to the associated image sensor 20.

The filter 24 may be integrated with the camera 18 or the filter 24 may be a separate filtering arrangement positioned relative to the camera 18. Keeping with the above-illustrative exemplary NIR LED illumination sources 12, the filter 24 may comprise a plastic NIR filter or a piece of developed negative film that is positioned in front of the light receiving lens 16, in front of the imaging sensor 20 or along an optical path within the camera 18. As another illustrative example, the camera 18 may include a built-in visible light (VIS) cutoff filter that is suitably positioned along an optical path within the camera 18 to block visible light.

Under this configuration, the filter 24 blocks visible light from being detected by the image sensor 20 of the camera 18. Therefore, the camera 18 is non-responsive (or is at least sufficiently immune) to adverse ambient visible light including ambient visible light intensity fluctuations. However, the image sensor 20 may respond to the invisible, e.g., UV or NIR light, from the illumination source 12 with sufficient resolution for its intended application, e.g., gaming or responding to electronic events in a virtual software application, etc.

Shadow Elimination/Reduction:

Existing shadowless light sources such as surgical ceiling lamps are too big and expensive for practical use in gaming and other computer-based applications where it is desirable to capture images of targets of interest. However, such expensive lighting sources are not necessary for applications such as gaming or responding to electronic events, as described more fully herein.

Figure 3:
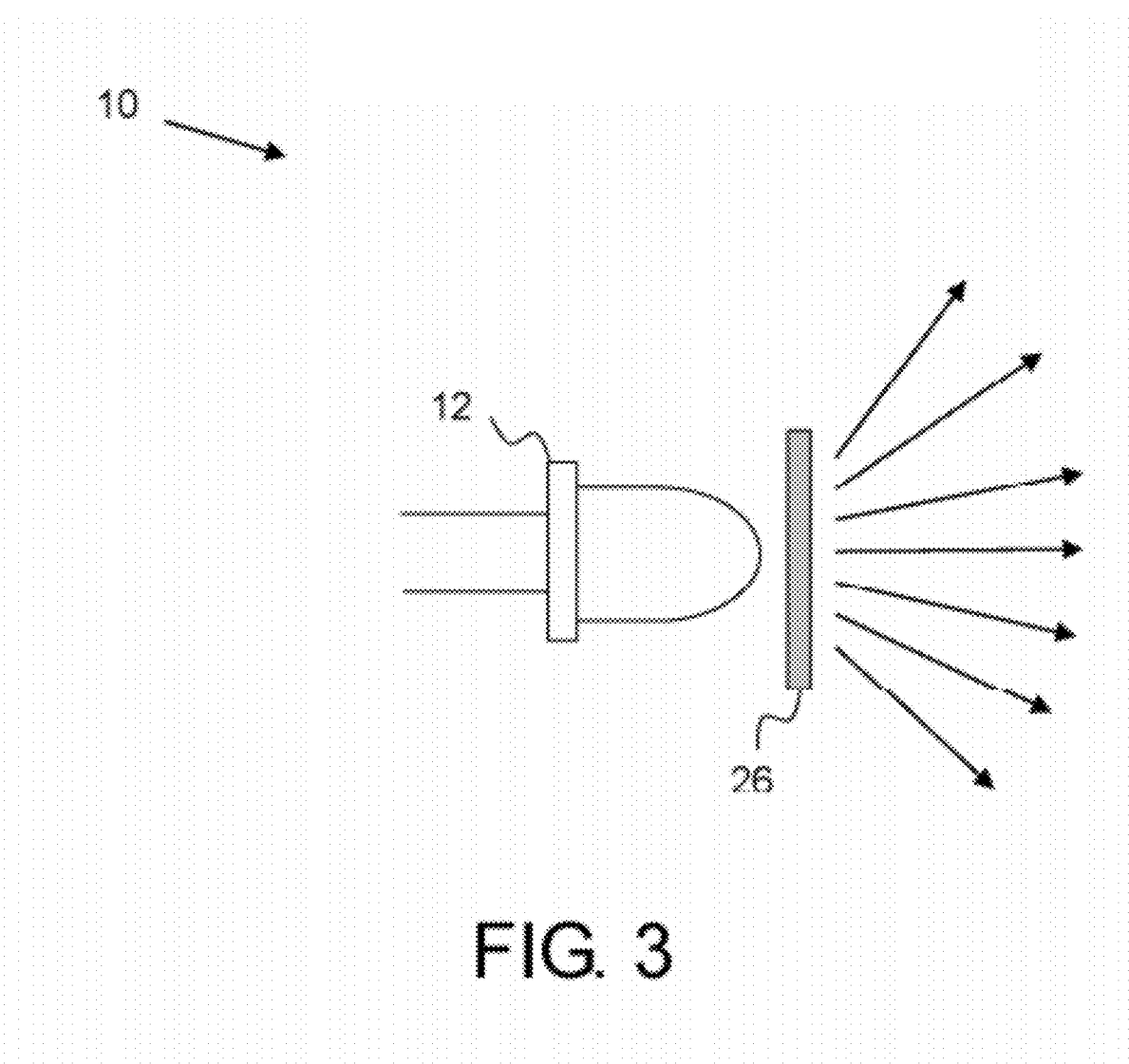
FIG. 3 is a schematic illustration of a method of scattering light to remove shadows according to various aspects of the present invention.

Referring to FIG. 3, a diffuser 26, e.g., constructed of plastic material, may be utilized to scatter the light from at least one associated illumination source 12 into many directions to reduce a shadow cast by a corresponding object, according to various aspects of the present invention. In this regard, the diffuser 26 will reduce the intensity of shadows but may not remove shadows completely. However, according to various aspects of the present invention, retro-reflection principles may further be utilized to reduce and/or eliminate shadows.

Figure 4:
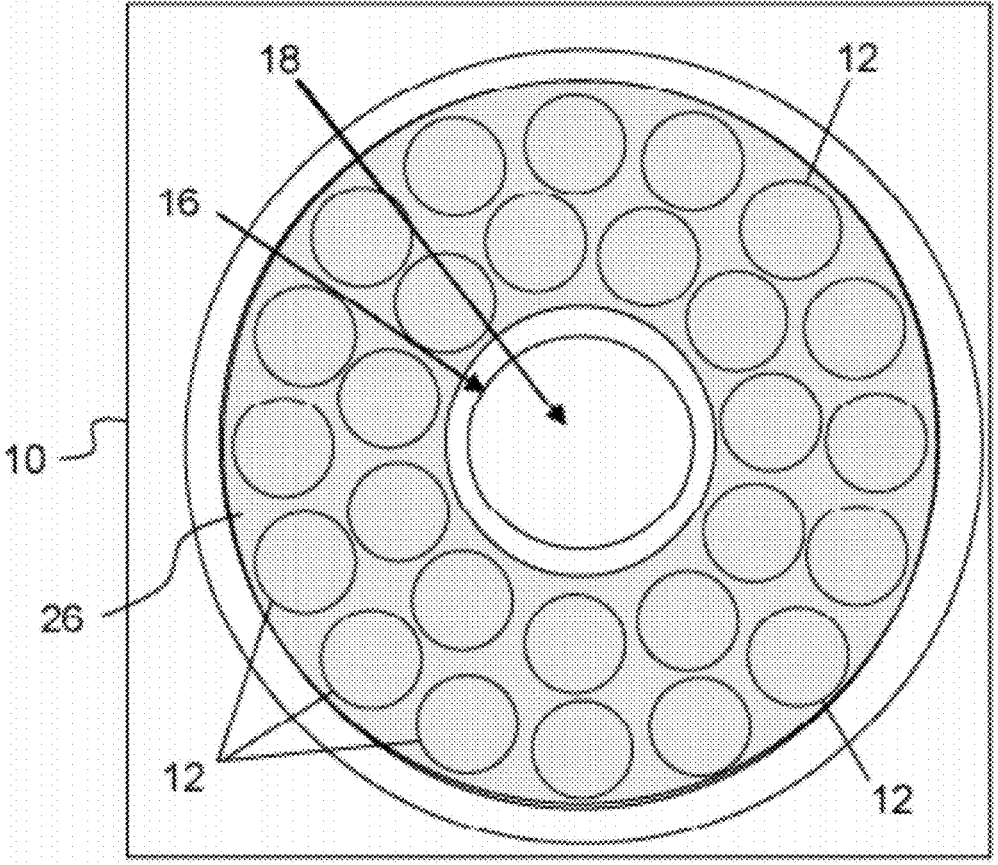
FIG. 4 is a schematic illustration of a plurality of illumination sources surrounding the light receiving lens of a corresponding camera according to various aspects of the present invention.

Referring to FIG. 4, illumination may be provided by a plurality of illumination sources 12, each of which may comprise a light-emitting device, e.g., NIR LEDs, PLEDs etc. (as described in applicant's U.S. Provisional Patent Application Ser. No. 61/058,798, entitled "MEASUREMENT AND SEGMENT OF PARTICIPANT'S MOTION IN GAME PLAY" filed Jun. 4, 2008, and corresponding U.S. patent application Ser. No. 12/478,533, entitled "MEASUREMENT AND SEGMENT OF PARTICIPANT'S MOTION IN GAME PLAY", both disclosures of which are already incorporated in their entirety by reference herein.

For example, as illustrated, the plurality of illumination sources 12 are provided in a configuration that surrounds the camera lens 16 of the camera 18.

As noted more fully herein, when the light emitted by the illumination sources 12 illuminates a target of interest 14, the reflected light returns to the camera lens 16 for image capture. It is also possible that a shadow cast by the target of interest onto a nearby structure such as a wall or other surface, will be reflected back to the camera lens. Accordingly, an optional diffuser may be utilized to scatter the light from an associated illumination source 12 into many directions to reduce a shadow cast by a corresponding object. Under this arrangement, the optional diffuser 26 may be implemented as a generally "donut-shaped" configuration that is positioned so as to diffuse light emitted by the illumination sources 12, e.g., a plurality of light emitting devices. Moreover, the illustrated diffuser does not optically interfere with the light receiving lens 16 of the camera 18. That is, the diffuser 26 is positioned so that it is not in an optical path of the light entering the lens 16 of the camera 18.

Although illustrated as a generally annular ring of illumination sources 12 that surround the light receiving lens 16 of the camera 18 (along with an optional corresponding "donut-shaped" diffuser), other configurations and number of illumination sources 12 may alternatively be utilized.

Figure 5:
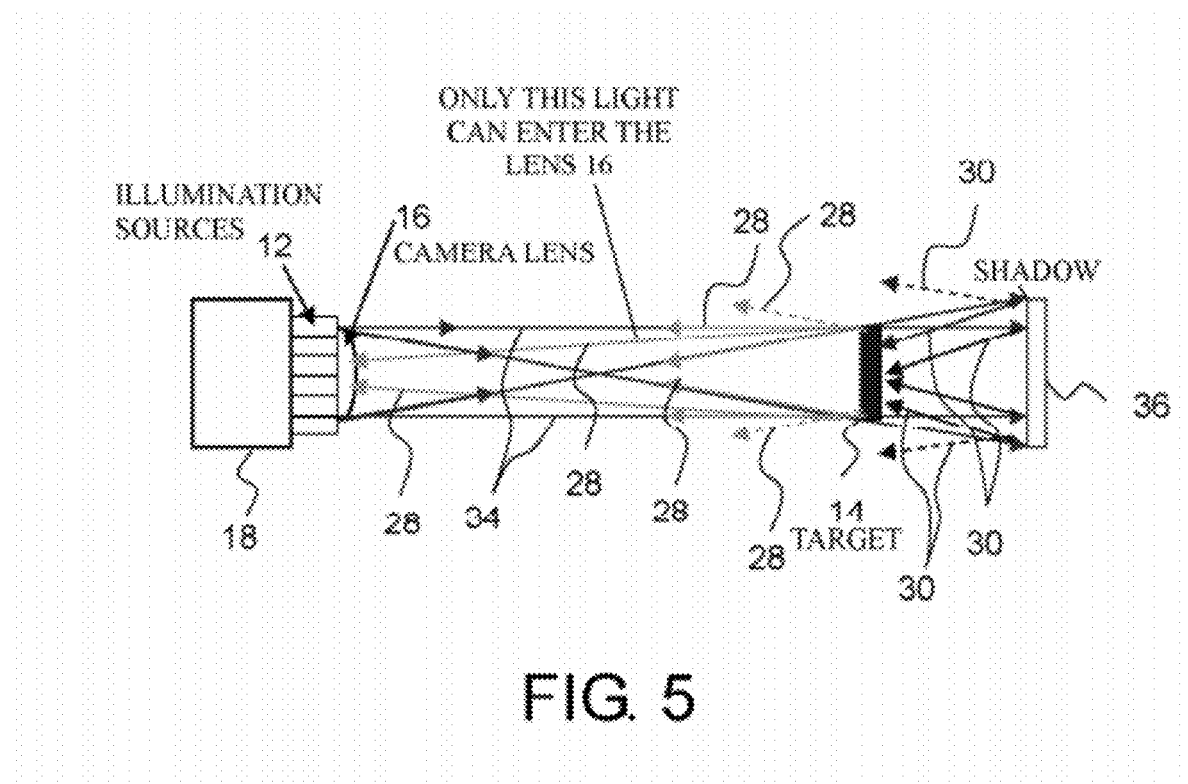
FIG. 5 is a schematic illustration of the elimination or reduction of shadows in an image received by a camera according to various aspects of the present invention.

Referring to FIG. 5, according to various aspects of the present invention, at least one illumination source 12 is arranged proximate to the camera lens 16 so that the light receiving lens 16 receives light from the at least one illumination source at a sufficiently small angle so as to at least substantially reduce detected shadows of the illuminated target of interest. In this regard, the light 34 that originates from the illumination source(s) 12 is proximate to the camera lens 16 and can be approximated as light that is "almost" from the camera lens 16, itself.

More particularly, as illustrated in FIG. 5, light 34 from the illumination sources 12 illuminates the target of interest 14, e.g., a person playing a video game or other suitable virtual application. As illustrated, the camera lens 16 can only accept the reflected light from the illumination sources 12, schematically illustrated by rays 28 that return at a small angle. Moreover, the illumination may cast shadows, illustrated by the rays 30. However, the target itself blocks the shadow reflections from entering the camera lens 16 as illustrated by the light rays reflected off a surface 36, e.g., a wall, which are blocked by (a back surface of) the target of interest 14. That is, according to the retro-reflection principle, the shadow light (represented by rays 30) of the target of interest 14 will be blocked by the target, e.g., subject or object itself, and cannot return to the lens 16 even if the target is moving. Rather, only the light reflected from target 14 can enter the lens. Thus, for example, in the context of a gaming system, the shadow light reflected by the wall is blocked by the participant.

If the level of shadow reduction is insufficient for a particular application, then a diffuser 26, e.g., as described with reference to FIGS. 3 and 4, herein, may be placed in front of the light sources 12, e.g., NIR LEDs in this example, to scatter the light and further reduce possible shadows as described more fully herein. In this regard, the diffuser 26 is not placed in front of the lens 16.

Figure 6:
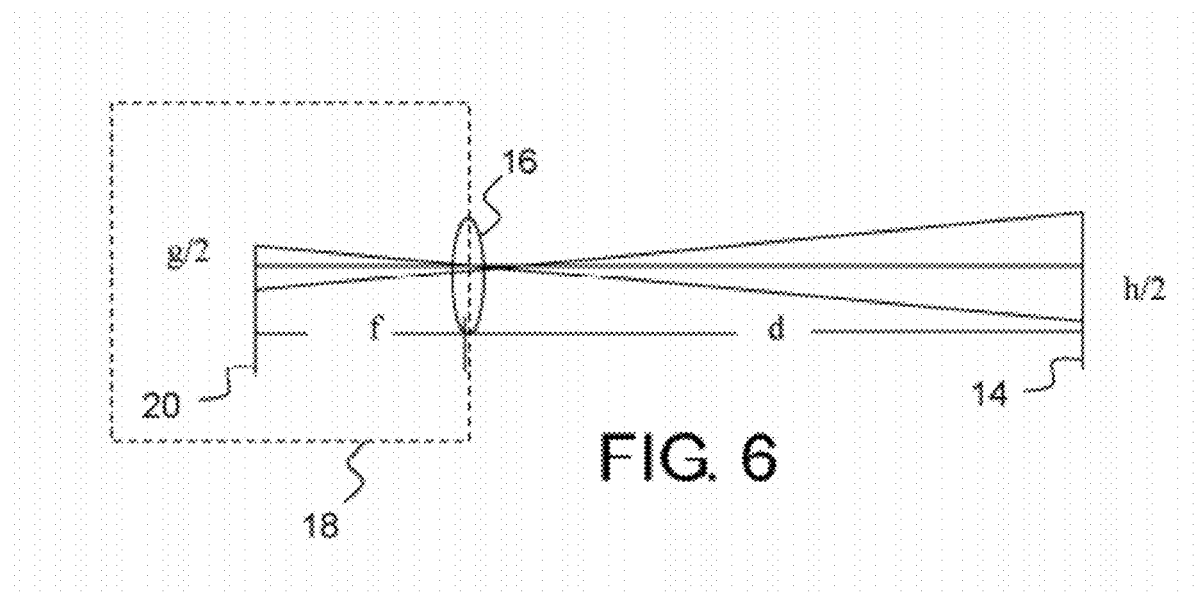
FIG. 6 illustrates the geometric relationship of optics for purposes of calculating the focal length of the camera according to various aspects of the present invention.

Geometry of the Optics:

Referring to FIG. 6, the geometric relationship of the optics is illustrated for purposes of calculating the focal length of the camera 18 according to various aspects of the present invention. It is likely, e.g., in the context of a gaming system or suitable virtual software application, that the camera 12 should see the entirety of the target of interest 14, e.g., the whole body of the participant. Let the height of the participant be designated by the reference "h" and let the distance from the camera 18 to the target of interest 14 be designated by the reference "d". Still further, let the height of the image sensor 20 of the camera be designated by the reference "g", and let the focal length of the camera lens 16 be designated by the reference "f". In this regard, the relationship may be characterized by:

$$(g/2)/f = (h/2)/d,$$

The focal length f may be computed by the following:

$$f = (g/h)d$$

As an illustrative example, if the camera 18 comprises a image sensor 20 such as an MT9V1111/4" CMOS FPA by Micron Technologies of Boise Id., USA, the pixel size is 5.6μ×5.6μ and the format is 640×480, then g=2.688 mm. If h=2 m=2,000 mm, and d=1.5 m=1,500 mm, then f=2.016 mm. If the camera comprises an image sensor such as an MT9V022 ⅓" CMOS FPA, also by Micron Technologies, the pixel size is 6μ×6μ and the format is 752×480, then g=2.880 mm. If h=2 m=2,000 mm, and d=1.5 m=1,500 mm, then f=2.16 mm.

3-D Video Segmentation:

According to various aspects of the present invention, systems and methods are provided, which trace or otherwise track a body or object of interest in 3-D space, e.g., by identifying the position (distance), movement direction (angle) and/or speed of movement of the hands, arms, feet, legs, head, etc. of a participant of a video game or other virtual application. This capability provides complete freedom to participate in games and/or to respond to other types of events in an interactive virtual environment without requiring the participant to wield hand controllers or other tracking tools.

Figure 7:
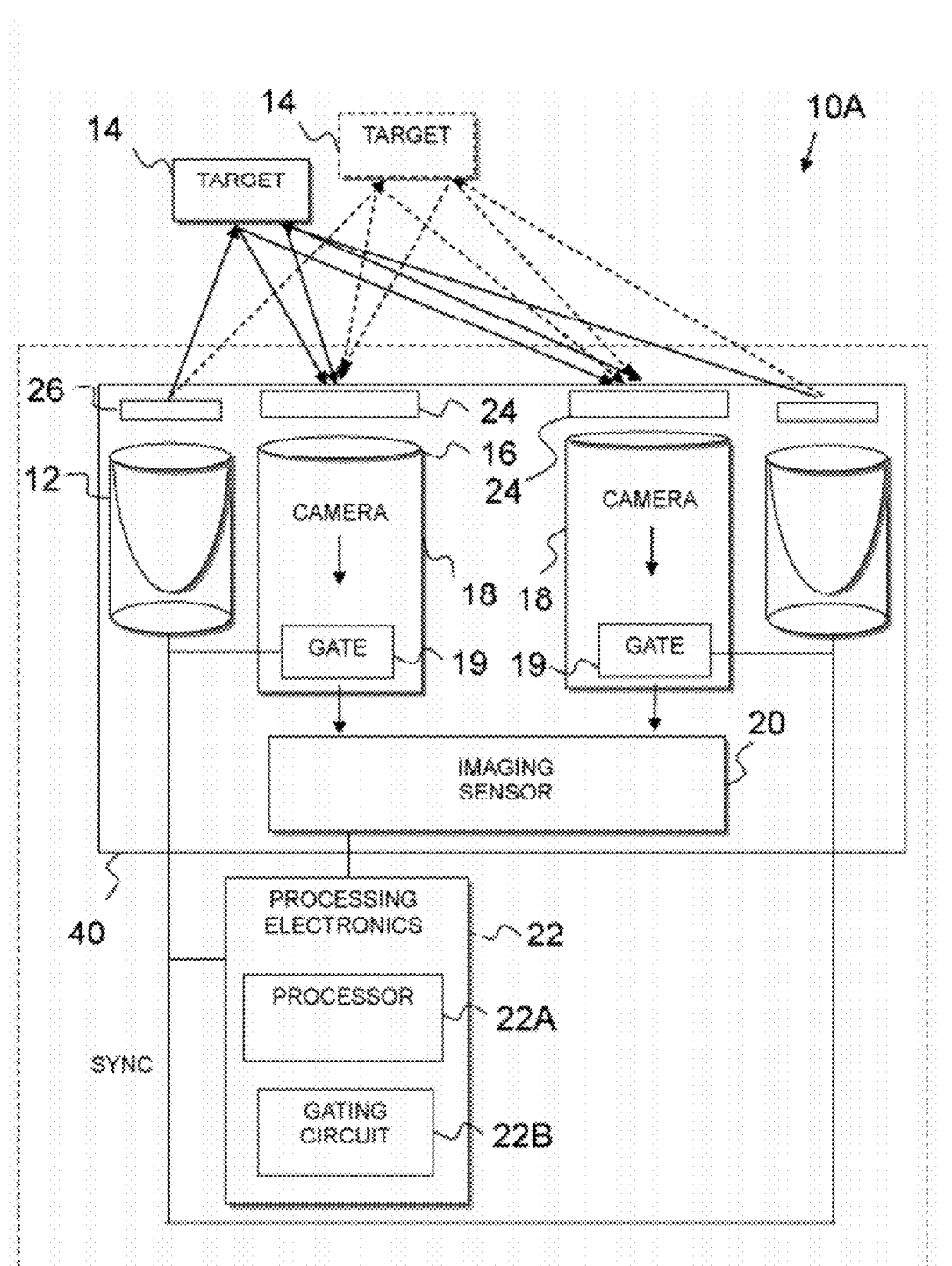
FIG. 7 is a schematic illustration of a stereo system for measuring the location and/or movement of a target of interest, e.g., a body part of a participant of a video game or other virtual interactive application, according to various aspects of the present invention.

Referring to FIG. 7, a system 10A is illustrated which is substantially identical to the system 10 of FIG. 1, except that the imaging capabilities of the system are in stereo. The system 10A may comprise a stereo camera 40 having one or more illumination sources 12 to illuminate a target of interest 14, e.g., a participant interacting with a video game or other virtual application. For example, the illumination source(s) 12 may comprise one or more parabolic invisible light emitting diodes which are utilized to emit a collimated thin beam or slightly divergent beam to illuminate the target of interest 14, as described in greater detail herein. In this regard, the stereo camera 40 may comprise a plurality of illumination sources 12 that collectively form a ring around each light receiving lens 16, in a manner analogous to that illustrated in FIG. 4. However, the illumination source(s) 12 may alternatively be arranged in any other practical arrangement suitable for detecting the target 14.

The light emitted from the illumination source(s) 12 that is reflected by the target of interest 14, e.g., a game participant, is received at the light receiving lenses 16 of the associated stereo camera 40. The camera 40 converts the invisible light from the illumination sources 12 into an image, e.g., using a suitable image sensor 20 with an optional filter 24, such as a visible cutoff filter optically positioned in front of each lens 16. The optional filter may alternatively be placed in front of the image sensor 20, as noted in further detail herein. The output of the image sensor 20 is coupled to a processor 22A of the processing electronics 22, which may also be utilized to control features of the system such as the gating circuit 22B to facilitate the measurement of objects of interest, such as the measurement of the participant's movement in the 3-D space as will be described in greater detail herein.

The system 10A may be utilized to measure the distance, angle and/or speed of the participant's hands, feet or other body movements. For example, image information from each of the cameras 18 in the stereo camera 40 may be combined onto the image sensor 20. For example, as illustrated in FIG. 7, the stereo camera has tracked the target 14 from an original position in a 3-D space as indicated by dashed lines around the target 14, to a current position in 3-D space, as indicated by solid lines associated with the target 14.

Figure 8:
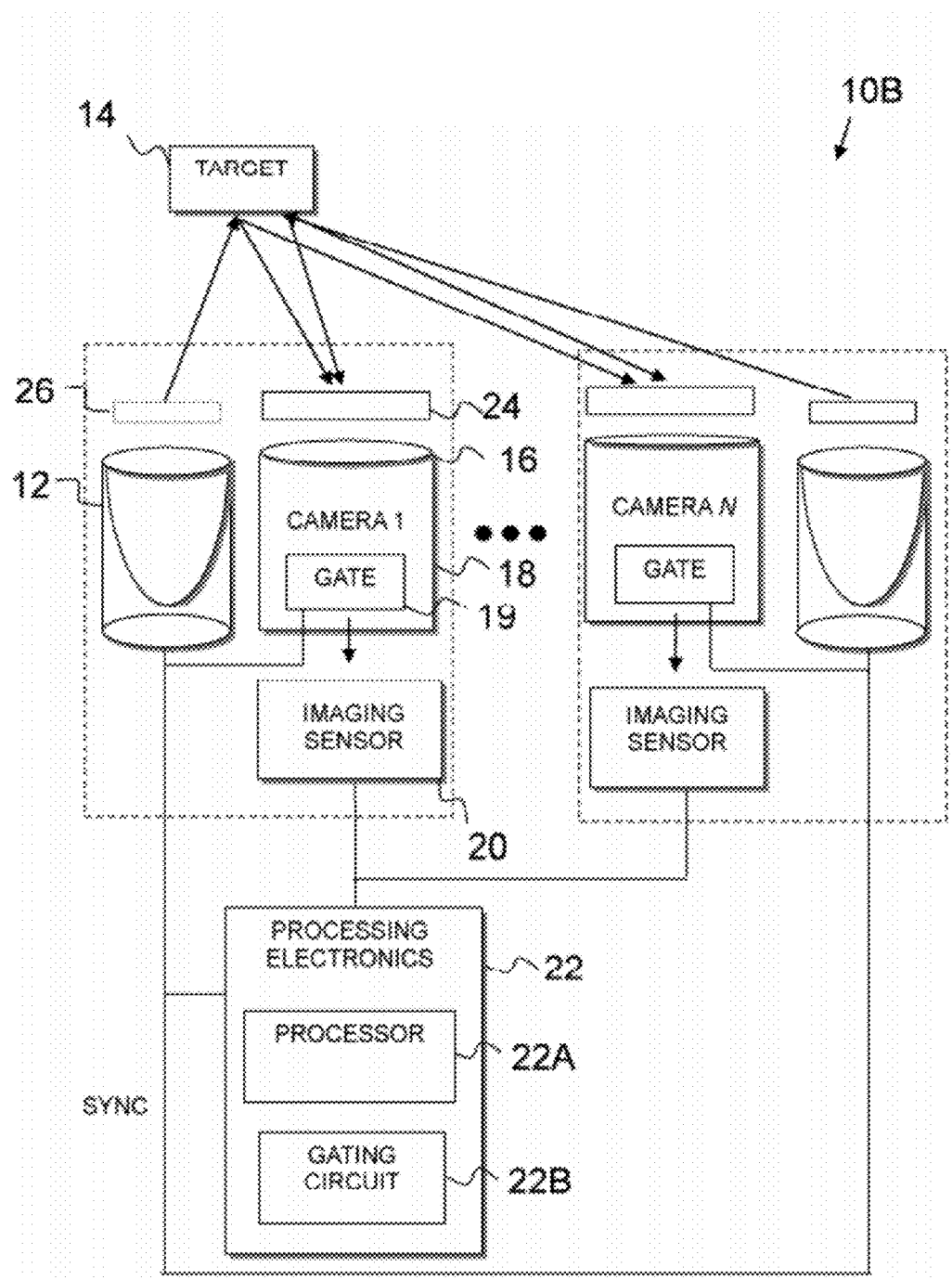
FIG. 8 is a schematic illustration of a system having a plurality of cameras for measuring the location and/or movement of a target of interest, e.g., a body part of a participant of a video game or other virtual interactive application, according to various aspects of the present invention.
Figure 9:
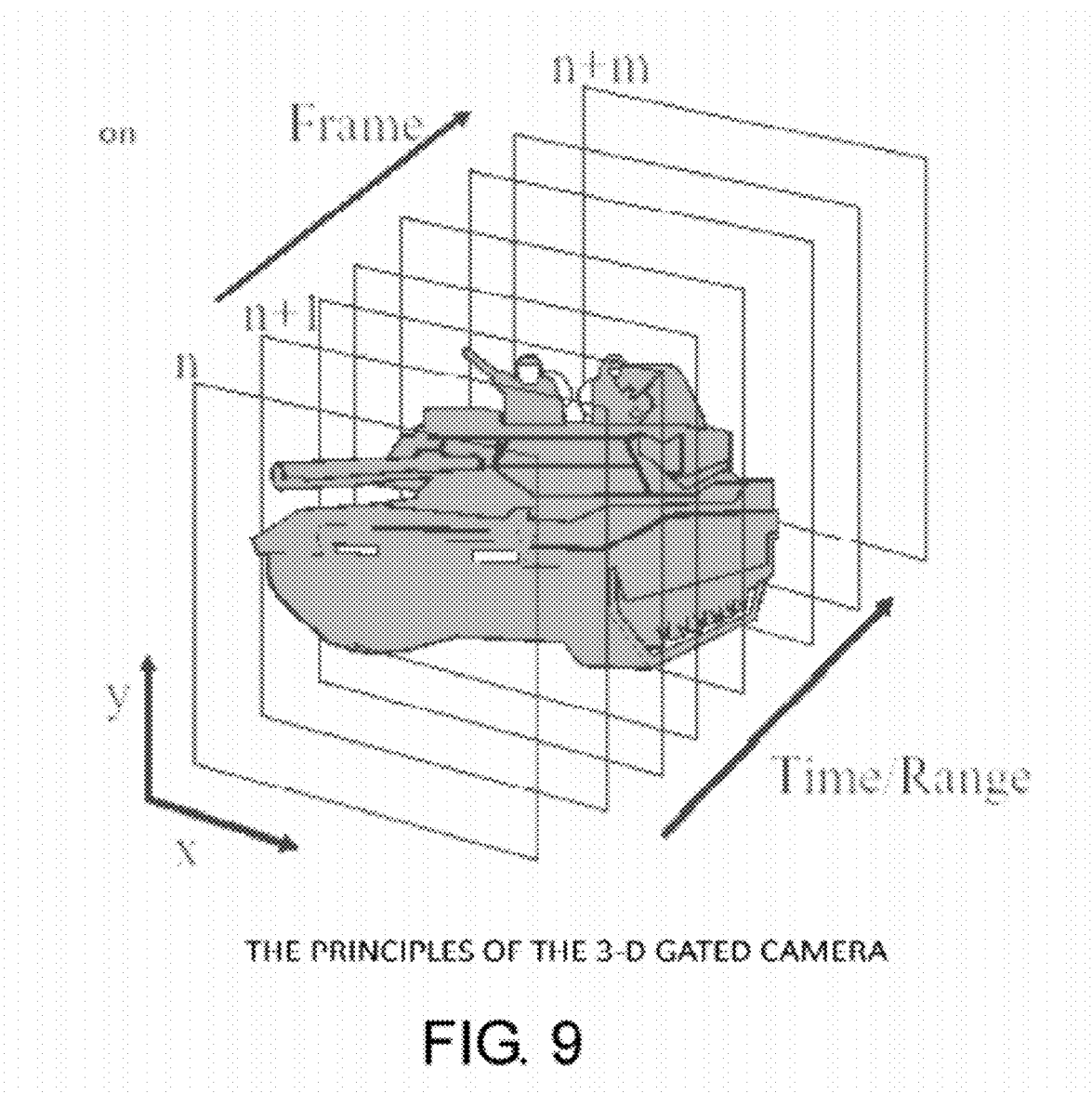
FIG. 9 is an illustration of an object modeled using a 3-D gated camera technique according to various aspects of the present invention.

Referring briefly to FIG. 8, according to further aspects of the present invention, a plurality of cameras 18, e.g., two or more cameras 18, which can be implemented as discrete cameras 18 may be coupled to the processing electronics 22 in order to generate 3-D information, as illustrated in system 10B. In the exemplary system illustrated, a total of N discrete cameras 18 are utilized where N is greater than one. Moreover, as illustrated schematically, each camera 18 has at least one illumination source 14. However, in practice, each camera 18 may be associated with one or more illumination sources 12, which may be arranged in any practical manner. By way of illustration, the light receiving lens 16 of each camera 18 may be surrounded by light sources 12, such as described with reference to FIG. 4.

Moreover, the illumination sources 12 may be arranged in other patterns or orders to provide suitable detection of a target 14. For example, two or more cameras 18 may share one or more illumination sources 12, such as where the illumination sources 12 are arranged in an array of illumination sources 12.

The system 10B may be utilized to measure the distance, angle and/or speed of the participant's hands, feet or other body movements. For example, image information from each of the cameras 18, e.g., as collected by each associated image sensor 20, may be digitally communicated to the processor 22. Correspondingly, the processor 22 may combine the image information from one or more image sensors 20 to render 3-D information, examples of which are described more fully herein.

According to further aspects of the present invention, 3-D information can be derived from a single camera as illustrated in FIG. 1, a stereo camera as illustrated in FIG. 7 or a plurality of cameras 18 as illustrated in FIG. 8 using segmentation techniques described more fully herein.

As an illustrative example, the illumination source(s) 12 may be controlled by either the gating circuit 22B or some other process synchronized to the gating circuit 22B, to emit a short pulse beam, e.g., of invisible or near invisible light, thus illuminating a participant of a game. The optional gating circuit 22B may also be configured to open the gate 19 of a corresponding camera 18 when the illumination source(s) 12, e.g., parabolic LED(s) are modulated ON during the short pulse. However, for multiple camera arrangements, a gate on the camera itself may not be needed.

Moreover, interleaving may be used, e.g., where two independent cameras 18 are utilized to combine two or more images into a 3-D image. In this way, the illumination from a first one of the cameras 18 does not interfere with the image data received by a second one of the cameras. That is, gating may be used to control the cameras 18, their associated illumination source(s) 12 and other appropriate components of the system 10 in a manner that enables the left and right channels of a stereo camera 18 or first and second discrete cameras 18, to work independently.

For example, where a stereo camera or two discrete cameras 18 are utilized, the corresponding illumination source 12 associated with a first camera 18 may be turned on and the illumination source 12 associated with the second camera 18 may be turned off. During this interval, the first camera (or first channel of a stereo camera) is operated to collect one or more images and the second camera 18 (or channel of a stereo camera) is not accessed. After a predetermined period, e.g., at least as long as the short pulse duration of the illumination source 12 of the first camera 18, the illumination source 12 associated with the first camera 18 is turned off and the illumination source 12 associated with the second camera 18 is turned on. Correspondingly, the first camera 18 is not accessed during this new period, and the second camera 18 is operated to collect one or more images.

Thus, the illumination source 12 of the first camera and the illumination source 12 of the second camera are modulated on and off in an alternating manner that interleaves the active (modulated ON state) of the illumination source 12 associated with each of the first and second cameras 18 (or left and right channels of a stereo camera 18). Correspondingly, the first and second cameras 18 (or left and right channels of a stereo camera 18) are selected in a manner commensurate with the pulses of their associated illumination source 12.

As an illustrative example, assume that the Parabolic LED (s) 12 associated with a camera 18 are modulated ON for a short pulse. The gating circuit 22B controls the camera 18 so as to open the gate 19 of the camera for a certain time duration from $t_1$ to $t_2=t_1+\delta t$, such that:

$$t_1=2d_1/c,$$

$$t_2=2d_2/c,$$

wherein $d_1$ is the predetermined closest distance of the target of interest 14 to the camera 18, $d_2$ is the predetermined furthest distance of the target of interest 14 to the camera, $\delta d=d_2-d_1$ is the limited moving area of the target of interest 14, and $c=3\times10^8$ m/s is the speed of the light. In this regard, the control electronics 22 may keep the gate of any other cameras 18 of the system 10 closed.

The gating circuit 22B modulates the parabolic LED(s) 120N at time zero and modulates the parabolic LED(s) 12 OFF at time $t_2$. Similarly, the gating circuit 20B may optionally open the camera 18 at time $t_1$ and close the camera 18 at time $t_2$. The duration is computed as $2(d_2-d_1)/c$.

Accordingly the operations of the illumination source(s) 12, e.g., parabolic LED(s), and camera 18 may be synchronized. Suppose that the participant will play in the limited area from 1.5 meters (m) to 3.5 m. In this example, the gate 19 opening time is $\delta t=2\times2$ m/c$=13.4\times10^{-9}$ s$=13.4$ ns, which is a significantly long enough time period for the gating circuit 22B to control the camera 18 for proper gating function. Since the pulse emitted by the parabolic LED(s) illuminates the target of interest 14, e.g., a participant such as a participant of a video game or virtual application in the area from $d_1$ to $d_2$, a single camera 18, a stereo camera or dual cameras 18 can obtain or otherwise derive the participant's stereo image and measure the 3-D information with regard to the position and/or movement of the participant.

In this regard, the illumination sources 12, e.g., light emitted from the LED(s) as disclosed herein, do not create adverse effects, such as to the participant's eyes (unlike conventional laser beams that are unusable in the context of the present example due to the potential harmful effects of conventional lasers on the eyes of the participants). Moreover, conventional incandescent light cannot emit a short pulse light. Further the visible light of a conventional incandescent light will be affected by ambient conditions such as the TV screen, computer monitor, wall/ceiling light etc.

However, the illumination sources 12, e.g., parabolic LED(s) of the present invention may be implemented as a semiconductor diode that can have a switching time on the order of nanoseconds and can be controlled by the gating circuit 22B. Moreover, unlike a common LED beam that has wide angle, low intensity and short distance the beam emitted by parabolic LED(s) 12 can be collimated to reach a long distance, such as approximately 3.5 m or more. Moreover, the invisible LED light of the parabolic LED(s) may be constant and is not affected by visible ambient light.

As noted in greater detail herein, the illumination source 12 may comprise a plurality of parabolic LEDs. In this regard, the illumination sources 12 may be configured in a 1-D parabolic LED array controlled to scan the target of interest 14, e.g., a video game participant. Alternatively, a 2-D parabolic LED array may be utilized to illuminate the participant without requiring a scan of the participant. Moreover, in certain implementations, the above-described gated parabolic LED 12 techniques may be used to remove the background and shadow after $d_2$. In this regard, a stereo camera 18 (or two discrete cameras) may be utilized to obtain the information necessary to generate necessary 3-D information from the 2-D images that have been processed to remove shadow and background noise.

Moreover, a single camera 18 may be utilized to capture 3-D information. As an illustrative example, assume that the camera 18 is allowed to open and close several times from $t_1$ to $t_2$ or from $d_1$ to $d_2$, and that several slices of the participant's image may be obtained for each Parabolic LED pulse. Thus, the system may obtain 2-D images for discrete slices of time on the image sensor 20, e.g., focal plane array. Additionally, distance information may be obtained by combining information derived from a series of 2-D image slices together in a segmentation process. For example, two or more slices may be evaluated to determine the movement distance, angle and speed of palms, hands, feet, legs, head/body, etc., of the participant in the 3-D space. Such movement information may be utilized to control a video game or interact with a virtual application without requiring position tracking tools. In this regard, the user may still utilize any necessary implements required by the game or virtual computer application.

However, the gate 19 of the camera 18 must be fast enough to implement video segmentation and the camera 18 must be sensitive enough to respond the short pulse, which may be less than 1 ns. As an illustrative example, the system 10 may utilize the gating circuit 22B to control a crystal (not shown) to open and close the gate 19 of the camera 18. Moreover, the system may utilize a high gain or intensified Charge Coupled LED Device (CCD) as the camera image sensor 20.

Moreover, although a gating operation may be very fast, the video frame rate of a corresponding system may be relatively slow. For example, the frame rate may be on the order of approximately 30 frames per second (f/s). Also, depending upon the technology utilized, the camera 18 may be always on. In this exemplary configuration, the gate of the camera 18 opens and closes with a frequency that may be on the order of nanoseconds per frame. As such, the signal can be accumulated to achieve a reasonable signal to noise ratio. Still further, a Complementary metal-oxide-semiconductor (CMOS) sensor, e.g., CCD/CMOS sensors less sensitive than an intensified CCD (ICCD), can be used to improve response time.

Figure 10:
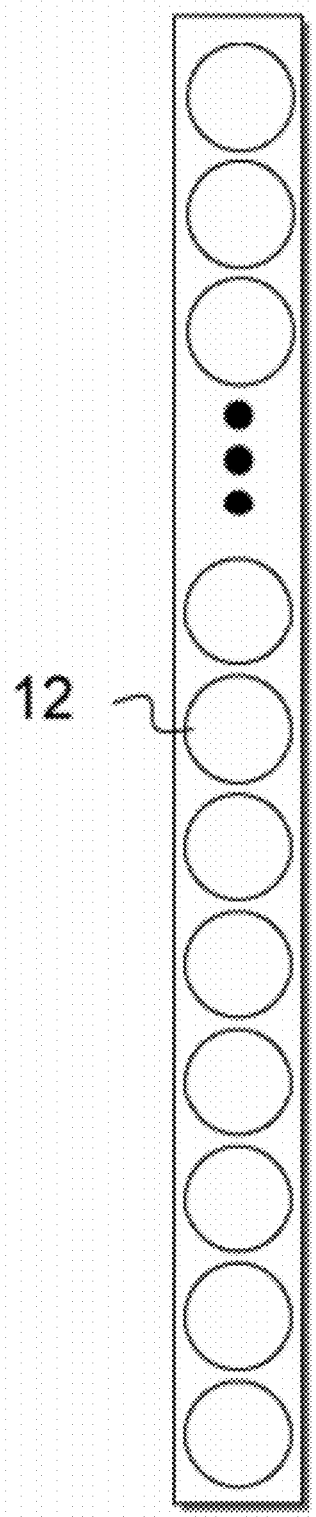
FIG. 10 is an illustration of a 1-D array of illumination sources according to various aspects of the present invention.
Figure 11:
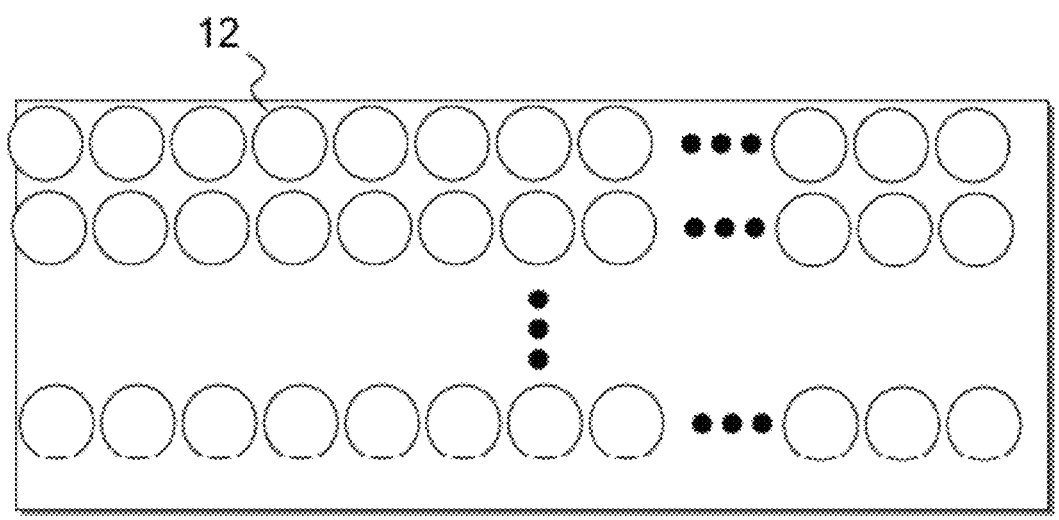
FIG. 11 is an illustration of a 2-D array of illumination sources according to various aspects of the present invention.

Thus, a stereo camera 40 or dual camera system is not necessary to generate 3-D information. Rather, the above-described segmentation techniques may be used with a single camera device to derive distance information from video segmentation/slice analysis by combining slices/frames together as illustrated. In order to get sufficient intensity, as mentioned above, a thin LED beam, e.g., using the parabolic LED implementation of the illumination device 12 described more fully herein, may be utilized to make a 2-D fast raster scan. As a further example, a 1-D parabolic LED array, e.g., as illustrated in FIG. 10, may be utilized in a scanning arrangement that is controlled by the gating circuit 22B and/or suitable processing. As yet another illustrative example, a 2-D array, e.g., as illustrated in either FIG. 4 or 11, may be implemented and controlled by the gating circuit 22B and/or other suitable processing. In this arrangement, the 2-D configuration may not require scanning as in the arrangement of FIG. 10. Although a conventional LED lamp may be utilized as a pulsed divergent beam to illuminate the participant, the intensity on the spots will not be as strong as the parabolic LED array and the distance will not be as long as the parabolic LED capability.

Various aspects of the present invention are described with reference to implementations for use with game systems. However, the various aspects of the present invention should not be construed as limited to gaming. Rather, the various aspects of the present invention are applicable to a broad range of applications where it is desirable to couple a camera device to a processing device for the identification and/or tracking of objects of interest. Thus, various aspects of the present invention may be utilized, for example, for implementing virtual interactions and other subject participation activities that are not "games" per se.

Also, in the various systems, e.g., 10, 10A, 10B described herein, it should be understood that other optical components may be required by a particular implementation, which are not illustrated for purposes of clarity of discussion herein.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present invention has been presented for purposes of illustration and description, but is not intended to be exhaustive or limited to the invention in the form disclosed. Many modifications and variations will be apparent to those of ordinary skill in the art without departing from the scope and spirit of the invention.

Having thus described the invention of the present application in detail and by reference to embodiments thereof, it will be apparent that modifications and variations are possible without departing from the scope of the invention defined in the appended claims.

What is claimed is:

1. A method for capturing images of targets of interest for interaction with or in response to electronic events, such as may be generated by video games and/or other interactive applications, comprising:

emitting light into an environment to illuminate a target of interest utilizing at least one parabolic light emitting diode that emits light in a substantially collimated beam, where the emitted light is in at least a first predetermined frequency range that defines a spectral range outside the range of visible fluctuating ambient light within the environment;

receiving the emitted light by a camera having a light receiving lens and an image sensor for converting the light received through the light receiving lens to image data, wherein the image sensor is sensitive to light within the first predetermined frequency range;

modulating at least one parabolic light emitting diode that is used to emit light into the environment, on for a predetermined time duration from t1 to t2=t1+δt, such that:

$t1=2d1/c,$ $t2=2d2/c,$ wherein d1 is the predetermined closest distance of the target of interest to the camera, d2 is the predetermined furthest distance of the target of interest to the camera, δd=d2−d1 is the limited moving area of the target of interest and c=is the speed of the light;

filtering the light received by the camera to substantially block light in the spectral range of fluctuating ambient light;

converting the image data from the image sensor to a digital representation of the target of interest; and measuring an aspect of movement of the target of interest in a 3-D space;

wherein at least one parabolic light emitting diode is positioned adjacent to the light receiving lens of the camera so as to substantially reduce detected shadows of the illuminated target of interest.

2. The method according to claim 1, wherein emitting light into an environment to illuminate a target of interest comprises illuminating light in at least one of the near infrared and ultra violet spectral ranges, defining the first predetermined frequency range.

3. The method according to claim 1, wherein emitting light into an environment to illuminate a target of interest comprising utilizing a parabolic light emitting diode that emits invisible light defining the first predetermined frequency range, in one of: a collimated thin beam and a slightly divergent beam.

4. The method according to claim 1, further comprising, surrounding the light receiving lens of the camera with a plurality of light emitting devices.

5. The method according to claim 4, further comprising: diffusing the light emitted by the plurality of light emitting devices.

6. The method according to claim 1, comprising configuring the focal length of the camera by:

$f=(g/h)d;$ where the height of the target of interest is designated by the reference "h";

the distance from the camera to the target of interest is designated by the reference "d", the height of the image sensor of the camera is designated by the reference "g", and the focal length of the camera lens is designated by the reference "f".

7. The method according to claim 1, further comprising gating the image sensor of the camera so as to enable the image sensor for forming an image of the light entering the camera, wherein the processor further controls the gate and correspondingly controls the modulation of the at least one illumination source so as to construct a 3-D representation of the target of interest.

8. The method according to claim 1, wherein:

emitting light into an environment to illuminate a target of interest utilizing at least one illumination source comprises providing a first illumination source and a second illumination source;

receiving the emitted light by a camera comprises providing a first camera associated with the first illumination source and a second camera associated with the second illumination source; and converting the image data to a digital representation of the target of interest comprises controlling the first and second illumination sources so as to collect image data from the first camera and not from the second camera when the first illumination source is modulated on, and collecting image data from the second camera and not from the first camera when the second illumination source is modulated on.

9. The method according to claim 1, further comprising: enabling a gate control associated with the camera to open and close several times from $t_1$ to $t_2$ or from $d_1$ to $d_2$, such that several slices of the participant's image is obtained for each pulse of the at least one illumination source.

10. The method according to claim 1, further comprising: utilizing a segmentation process to determine distance information associated with the target of interest by combining information derived from a series of 2-D image slices obtained by the image sensor.

11. A constant and shadowless light system comprising:

at least one illumination source that emits light into an environment to illuminate a target of interest, where the emitted light is in at least a first predetermined frequency range that defines a spectral range outside the range of fluctuating ambient light within the environment;

a stereo camera comprising:

a first light receiving lens;

a second light receiving lens; and an image sensor that is common to the first light receiving lens and the second light receiving lens of the stereo camera that is sensitive to light within the first predetermined frequency range, which forms an image based upon light from one of the first light receiving lens and the second light receiving lens; and a processor configured to convert the image data from the image sensor to a digital representation of the target of interest;

wherein at least one illumination source is positioned adjacent to the first light receiving lens of the camera so that the first light receiving lens receives light from the at least one illumination source so as to substantially reduce detected shadows of the illuminated target of interest.

* * * * *